Figure 1:
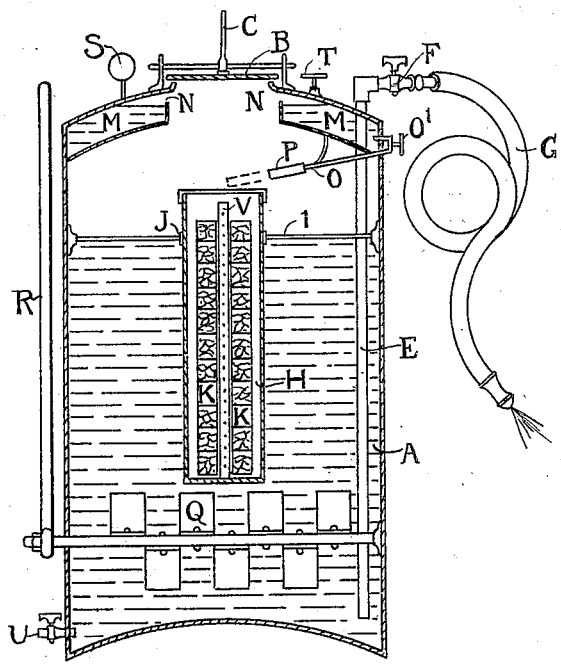

No. 879,929. PATENTED FEB. 25, 1908.
W. TYREE.
AUTOMATIC SPRAYING DEVICE.
APPLICATION FILED JUNE 13, 1907.

2 SHEETS—SHEET 1.

Witnesses
Alfred De Risso
Arthur E Goodier

Inventor
William Tyree

No. 879,929. PATENTED FEB. 25, 1908.
W. TYREE.
AUTOMATIC SPRAYING DEVICE.
APPLICATION FILED JUNE 13, 1907.

2 SHEETS—SHEET 2.

UNITED STATES PATENT OFFICE.

WILLIAM TYREE, OF NELSON, NEW ZEALAND.

AUTOMATIC SPRAYING DEVICE.

No. 879,929.  Specification of Letters Patent.  Patented Feb. 25, 1908.

Application filed June 13, 1907. Serial No. 378,850.

*To all whom it may concern:*

Be it known that I, WILLIAM TYREE, a British subject, and citizen of New Zealand, Australasia, residing in and having an industrial or commercial establishment in Trafalgar street, Nelson, New Zealand aforesaid, have invented new and useful Improvements in an Automatic Spraying Device, of which the following is a specification.

In automatic sprays for the purposes stated, it is found, in some cases, where the carbid of calcium is thrown into the mixture or solution for spraying purposes contained in the cylinder of the apparatus, that the carbid impairs or destroys the efficiency of the mixture or solution for the purpose to which it is applicable. It is also found that the carbid of calcium sometimes contain foreign substances, such as metallic iron, derived in the manufacture of the carbid by fusion of the iron bands holding the electrodes, the particles of such metallic iron stopping up the nozzles of the sprays. Also, that if the carbid is not accurately weighed too much pressure of gas may be generated in the cylinder with damaging results, or a sufficient force of gas may not be generated, in which case the spray fails to work.

In the automatic sprays hitherto constructed by me and the subject of a previous patent application, Serial Number 343,440, filed November 14, 1906, when the spraying of oil or paint is required a separate combined carbid and water chamber are attached to the outside of the cylinder. I remedy the above mentioned defects and provide in the case of oil or paint for a carbid chamber being fixed inside the cylinder by the improvements the subject of my present invention. A carbid chamber being fixed inside the cylinder is the more approved construction, the solution or mixture in the cylinder serving the purpose of a water jacket to the carbid chamber. The said improvements are carried out, either by constructing a cylinder (being as usual of metal) having a dome shaped top made in double form so as to form an inner receptacle to serve as a water chamber, or by having an outside water chamber constructed on the top of the cylinder; there being in either case an aperture or apertures in the top of the apparatus, fitted with a gas tight lid or lids, for the admission into the cylinder of the solution, and of a carbid chamber or chambers. When the water chamber is so constructed as an inner receptacle, water is placed therein by means of an irregular shaped movable funnel inserted into an open space left in the top of the water chamber for the purpose. This open space serves the double purpose for the admission of water into the chamber and for the pressure of gas upon the water so as to cause the water to flow readily through a pipe fixed in a horizontally inclined position into the lower portion thereof. This pipe is carried into the cylinder so as to reach the top of an inner chamber suspended therein holding a carbid receptacle or receptacles and hereinafter designated as the carbid chamber. The said pipe has a movable slide thereon, consisting of a short length of tube fitting on the outside thereof, such slide being moved forward when the carbid chamber is to be charged and moved backward for the purpose of removing such chamber.

When the apparatus is constructed with the outside water chamber as before mentioned, the latter is filled with water below the level of a pipe fixed therein from a point near the top and passing through the bottom of the water chamber into the cylinder. The object of this pipe is to bring pressure of the gas passing through it from the cylinder upon the water in the chamber, so as to cause the water to flow readily through a pipe also fixed in a horizontally inclined position in the lower portion of such water chamber and carried to the carbid chamber suspended in the cylinder as in the other form of construction. The said pipe has a tap or valve fixed therein external to the cylinder to control the flow of water from the water chamber as constructed in either way. In either form of construction two carbid chambers instead of one may be constructed inside the cylinder with a horizontally inclined pipe as described from the water chamber communicating with each. And when two carbid chambers are so constructed one chamber only or both chambers can be used by means of the taps operating the said pipes.

A material feature in my invention is the arrangement or combination of parts by means of which the supply of gas generated may be controlled from the outside of the apparatus. Any arrangement of parts which would substitute any other means besides, that of a tap or taps fixed into a pipe or pipes outside the cylinder, would be covered by my invention. The carbid chamber or chambers placed in the cylinder are suspended therein by means of a ring or rings held in position by a rod passing across the cylinder.

I construct a carbid chamber for use in the apparatus in circular form with a perforated iron tube fixed from top to bottom in the center thereof. Perforated circular cups or receptacles having tubes passing through the centers and entire depths thereof so as to slide over such perforated iron tube, are fixed thereon throughout its length the said receptacles having such quantity of carbid placed therein as to allow space for expansion. The slide on the horizontally inclined tube leading from the water chamber is adjusted so as to allow the water to flow into the said perforated iron tube, and passing to the bottom thereof the water will be gradually conveyed from the lower to the upper compartments formed by the said cups or receptacles. This arrangement, the construction of the apparatus with the carbid chamber inside the cylinder, and the slow water-feed by means of the pipe leading from the water chamber being operated by the tap therein, all serve to keep down the temperature of the carbid which is liable to ignite at a pressure of three atmospheres. These improvements in my invention enlarge the scope of the purposes to which it may be applied, and are attended with a more successful result than is found to accompany other modes of construction. For small sizes of the apparatus, that is to say not exceeding six gallons, I bring about the same result by a simpler contrivance. I place the carbid in a perforated cylinder constructed to fit into the carbid chamber so as to leave a small space between the side of such cylinder and the side of the carbid chamber; and above such cylinder and resting thereon in the carbid chamber, I place a cylinder of the same size containing water. A small hole being drilled in the side near the bottom thereof, the water runs down the side of the carbid chamber and attacks the carbid as it rises in the chamber.

A pipe or two or more pipes is or are fixed in and project from the cylinder. A tap is fixed into the external end of each pipe, and a tube or length of hose of convenient length affixed thereto in such a way that the same can be moved by the hand in different directions. Any spraying nozzle can be attached to the end of each tube or length of hose. The said pipe or pipes may be either carried through the top of the cylinder terminating a short distance above the bottom or fixed into the bottom of the cylinder.

The cylinder of the apparatus is constructed with dome shaped ends in the usual manner in which gas cylinders are constructed. Provision is made to prevent when required any settlement taking place in the solution or paint contained in the cylinder by an agitator consisting of a sheet or flaps of metal having a rod attached thereto passing through a stuffing box in the cylinder operated by means of a lever or handle. The apparatus may be constructed without such agitator if not required for the solution to be used.

My invention is more particularly described in connection with and is illustrated in the accompanying drawings in which the same letters indicate the like parts.

Figure 2:
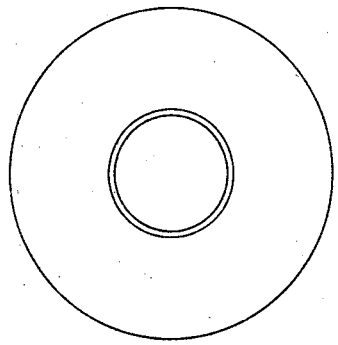
Figure 5:
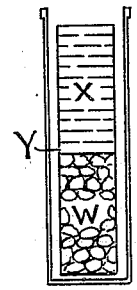
Figure 3:
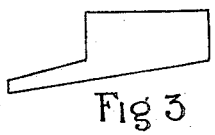
Figure 4:
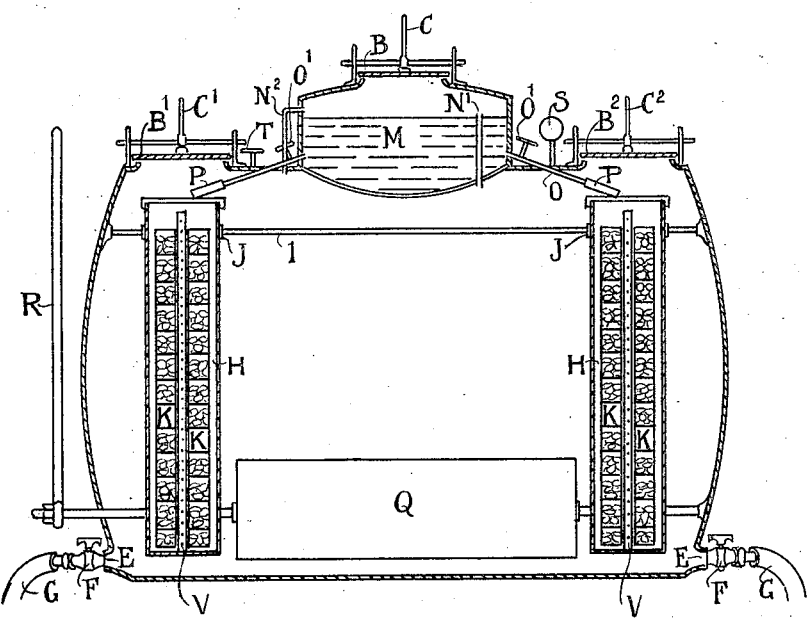

In the said drawings Figure 1 is an elevation of apparatus the subject of my invention having the water chamber constructed inside the cylinder. Fig. 2 is a plan showing top of the cylinder in such construction. Fig. 3 is a movable funnel. Fig. 4 is an elevation of apparatus having the water chamber external to the cylinder and showing two carbid chambers constructed therein. Fig. 5 is an elevation of the carbid chamber inside the cylinder showing a carbid receptacle and water chamber fitted therein as the simpler contrivance mentioned for the smaller sizes of the apparatus.

In Figs. 1 and 4 "A" is a metal cylinder which is filled to the level of the rod "I" with the liquid or solution required. "B" in Fig. 1 and "B" "B$^1$" and "B$^2$" in Fig. 4 are gas tight doors secured by the cam levers "C" in Fig. 1 and "C" "C$^1$" and "C$^2$" in Fig. 4. "E" is an outlet pipe shown as carried into the cylinder through the top in Fig. 1 and shown as fixed into the bottom of the cylinder in Fig. 4, through which the liquid or solution will be forced by the acetylene gas generated. Another pipe or other pipes may be fixed in the cylinder in like manner according to the construction so that several nozzles can be operated at once. "F" shows a stop valve or tap attached to an outlet pipe external to the cylinder. "G" is a tube of iron or length of hose having a spray device or nozzle fixed thereon.

"H" in Figs. 1 and 5 is a carbid chamber and "H" "H$^1$" in Fig. 4 are carbid chambers suspended on a rod through a ring or rings "J" held thereon.

In Figs. 1 and 4 "K" shows removable perforated receptacles to hold carbid of calcium fitting over the perforated tube "V", passing through the said carbid chamber or chambers. "M" is a water chamber constructed in the dome shaped top of the cylinder as shown in Fig. 1, or on the outside of the cylinder as shown in Fig. 4. "N" "N" in Fig. 1 are openings by which the water chamber shown therein may be filled by means of the movable funnel shown in Fig. 3. "N$^1$" in Fig. 4 is a pipe fixed in the inside of the water chamber leading into the cylinder so as to convey gas from the cylinder into the water chamber. "N$^2$" in Fig. 4 is the alternative construction for such purpose of a pipe fixed on the outside of the water chamber.

"O" in Fig. 1 is a pipe and "O" "O" in Fig. 4 are pipes fitting into the water chamber "M" and leading therefrom to the carbid chamber or chambers. "O¹" is a tap or valve operating the pipe "O" or pipes "O" "O". "P" or "P" "P" is a slide or slides fitted on such pipe or pipes, so that when carried forward the pipe or pipes will convey water into the carbid chamber or chambers through the pipe "V" or pipes "V" "V". "Q" is an agitator operated by the lever "R" at the bottom of the cylinder "A". "S" is a pressure gage. "T" is a safety valve. "U" in Fig. 1 is an outlet cock. "V" in Fig. 1 is the perforated pipe and "V" "V" in Fig. 4 the perforated pipes in the center of the carbid chamber or chambers.

In Fig. 5 "W" shows the perforated cylinder or carbid receptacle placed in the carbid chamber "H". "X" the cylinder containing water placed on the top thereof. "Y" a hole in the side of the said water chamber "X" for the flow of water therefrom.

The cylinder being filled to the level of the rod "I" with paint, liquid, or solution required to operate the spray, the apparatus is moved or carried to the place or places where the spray is to be used. The operation of the tap or taps "O" admits water to the carbid chamber or chambers. Acetylene gas being generated, the same forces the liquid or solution through the tube or tubes in the cylinder, the outer tubes attached thereto, and the nozzles in the form of a spray which will continue until nearly all the liquid or solution is exhausted, or until it is stopped by turning the tap or taps in the tube or tubes.

By looking at the pressure gage "S" the operator can tell the pressure of the gas generated so as to ascertain whether an increased flow of water is required or whether the same should be diminished. The requisite pressure of gas can be easily ascertained in the use of the spray.

One purpose for which my invention would be applicable is the operation of the spray upon a drill used in mining. A quantity of powdered particles or dust, generally containing a mineral substance, being generated in the working of the drill, which is most injurious to the workers inhaling the same, such dust is settled by the operation of the spray. As the escape of acetylene from the apparatus when the operation of the spray has ceased, might be attended with danger in the mine, I attach to the apparatus a flexible pipe or tube in which a tap is placed, so that the mouth of such tube being fixed upon an inlet into a gasometer placed in the mine, the acetylene remaining in the cylinder can be discharged into the gasometer. Such gasometer can be used in the mine for lighting purposes.

Having now particularly described and ascertained the nature of my said invention, and in what manner the same is to be performed, I declare that what I claim is—

1. An automatic spraying device comprising a receptacle adapted to contain the fluid to be sprayed, a carbid chamber in said receptacle for the generation of acetylene gas, a water chamber, a pipe leading therefrom, to the carbid chamber, a valve in said pipe and means for operating the valve from the exterior of the receptacle.

2. An automatic spraying device comprising a receptacle adapted to contain the fluid to be sprayed, a carbid chamber in said receptacle for the generation of acetylene gas, a vertical perforated tube in said carbid chamber extending from the top to the bottom thereof, circular perforated cups, or receptacles for carbid slidably supported on said tube, a water chamber, a pipe leading therefrom to the carbid chamber, a valve in said pipe and means for operating the valve from the exterior of the receptacle.

3. A spraying device comprising a receptacle adapted to contain the fluid to be sprayed, means for subjecting the said fluid to the action of acetylene gas to force the fluid out of the receptacle separated by a tap or valve external to the cylinder and a pressure gage on the receptacle.

Dated the second day of May 1907.

WILLIAM TYREE.

Witnesses:
ALFRED DE LISSA,
ARTHUR S. GOODIN.